United States Patent [19]

Lehnert

[11] 4,393,329
[45] Jul. 12, 1983

[54] ARTICLE OF MANUFACTURE FOR PROJECTION TELEVISION SYSTEM

[75] Inventor: Stanley E. Lehnert, Addison, Ill.

[73] Assignee: Zenith Radio Corporation, Glenview, Ill.

[21] Appl. No.: 154,197

[22] Filed: May 29, 1980

Related U.S. Application Data

[63] Continuation-in-part of Ser. No. 110,413, Jan. 7, 1980, Pat. No. 4,274,110.

[51] Int. Cl.³ .................................................. H01J 29/86
[52] U.S. Cl. ................................. 313/477 R; 313/364; 313/461; 313/474
[58] Field of Search ...................... 220/2.1 A; 313/474, 313/477, 478, 416, 461, 482, 415, 364, 398

[56] References Cited

U.S. PATENT DOCUMENTS

| | | | |
|---|---|---|---|
| 2,188,661 | 1/1940 | Knoll | 313/478 X |
| 2,395,099 | 2/1946 | Cage | 313/461 X |
| 2,467,462 | 4/1949 | Brown | 313/478 X |
| 2,654,854 | 10/1953 | Seright | 315/370 |
| 2,777,084 | 1/1957 | Lafferty | 313/458 |
| 2,989,584 | 6/1961 | Mengle | 358/60 |
| 3,384,712 | 5/1968 | Gruen | 313/474 X |
| 3,696,261 | 10/1972 | Miyaoka | 313/414 |
| 3,943,279 | 3/1976 | Austefjord | 358/60 X |
| 4,004,093 | 1/1977 | Oland | 358/60 |
| 4,024,579 | 5/1977 | Hergenrother et al. | 358/231 |
| 4,084,113 | 4/1978 | Vogelpohl | 313/477 R |
| 4,101,803 | 7/1978 | Retsky et al. | 313/477 R X |
| 4,194,216 | 3/1980 | Ohmori | 358/60 |

FOREIGN PATENT DOCUMENTS

| | | | |
|---|---|---|---|
| 2837249 | 3/1979 | Fed. Rep. of Germany | |
| 55-12683 | 1/1980 | Japan | 313/477 R |

Primary Examiner—Eugene La Roche

[57] ABSTRACT

An article of manufacture is disclosed for use in a projection television system. A cathode ray picture tube has a face panel with a rearwardly extending skirt and a window for receiving a cathodoluminescent imaging screen. The tube has a seal land which defines a plane whose normal makes a non-zero acute angle with respect to the axis of said window. The article is for use in a system having a cathode ray picture tube whose projection optical axis is on the axis of a remotely located viewing screen, and at least one displaced axis cathode ray picture tube; that is, a tube whose projection optical axis is displaced from the axis of the viewing screen by a non-zero acute angle.

10 Claims, 23 Drawing Figures

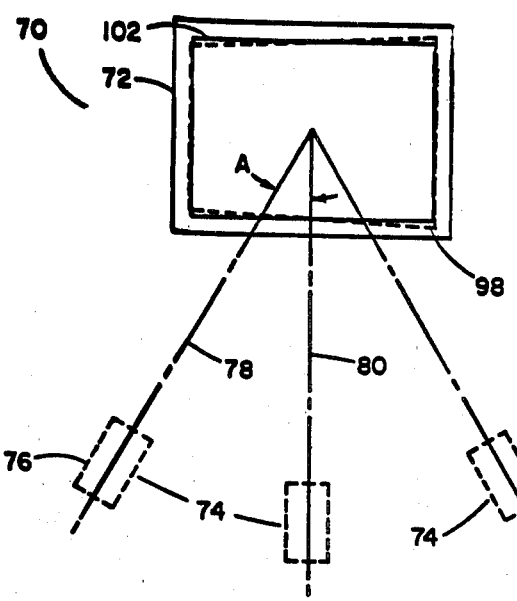
Fig. 4
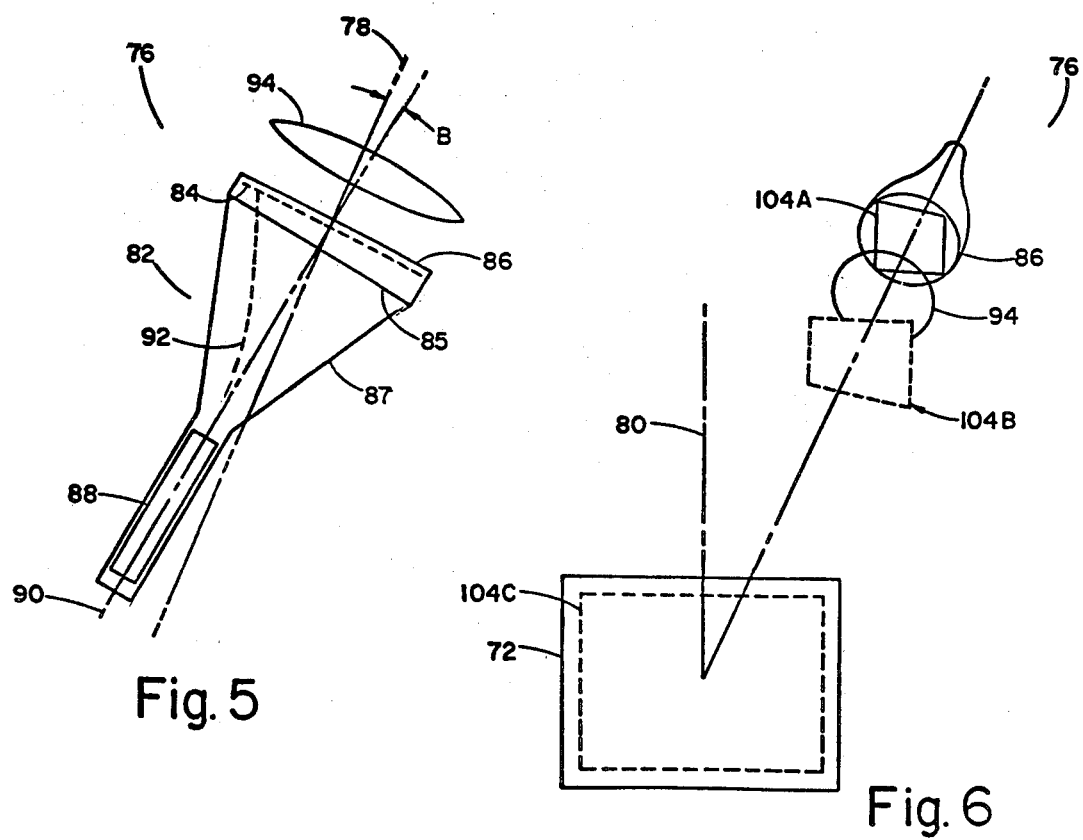
Fig. 5
Fig. 6

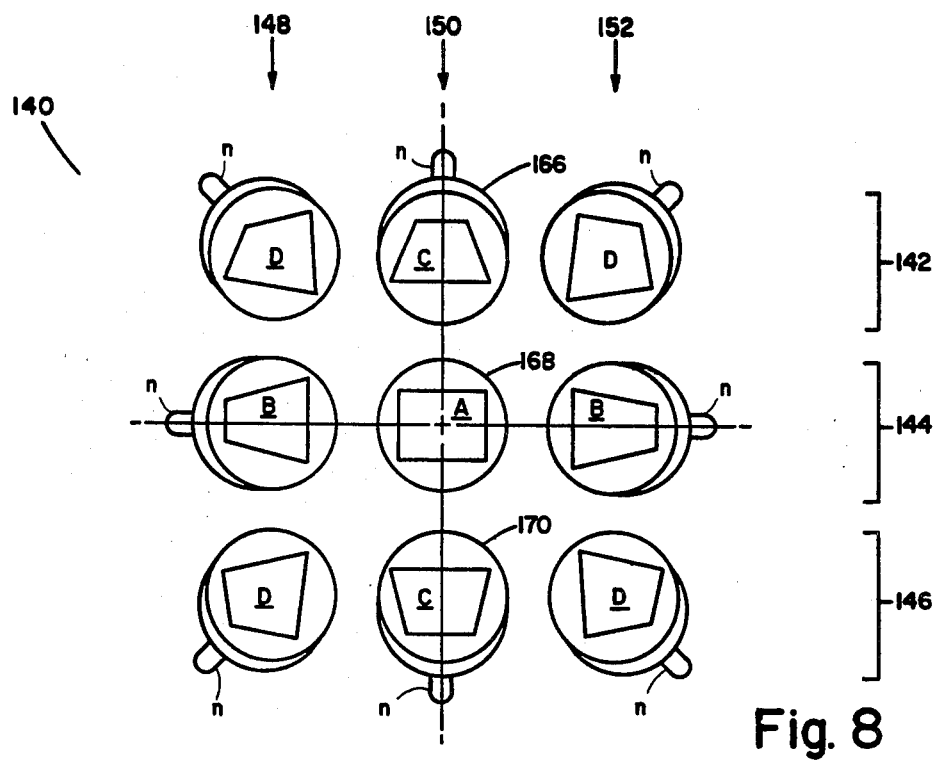
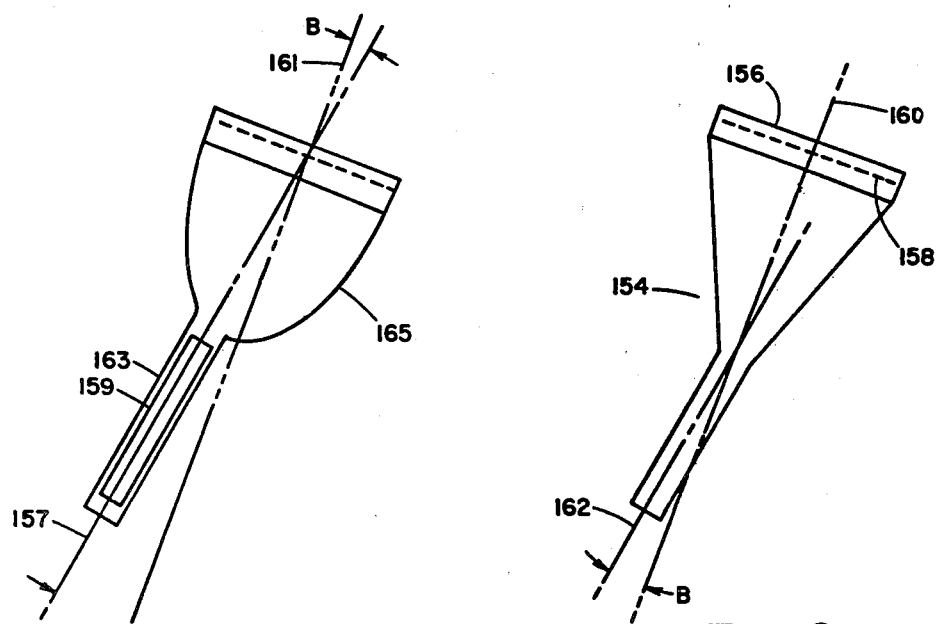
Fig. 8
Fig. 10
Fig. 9

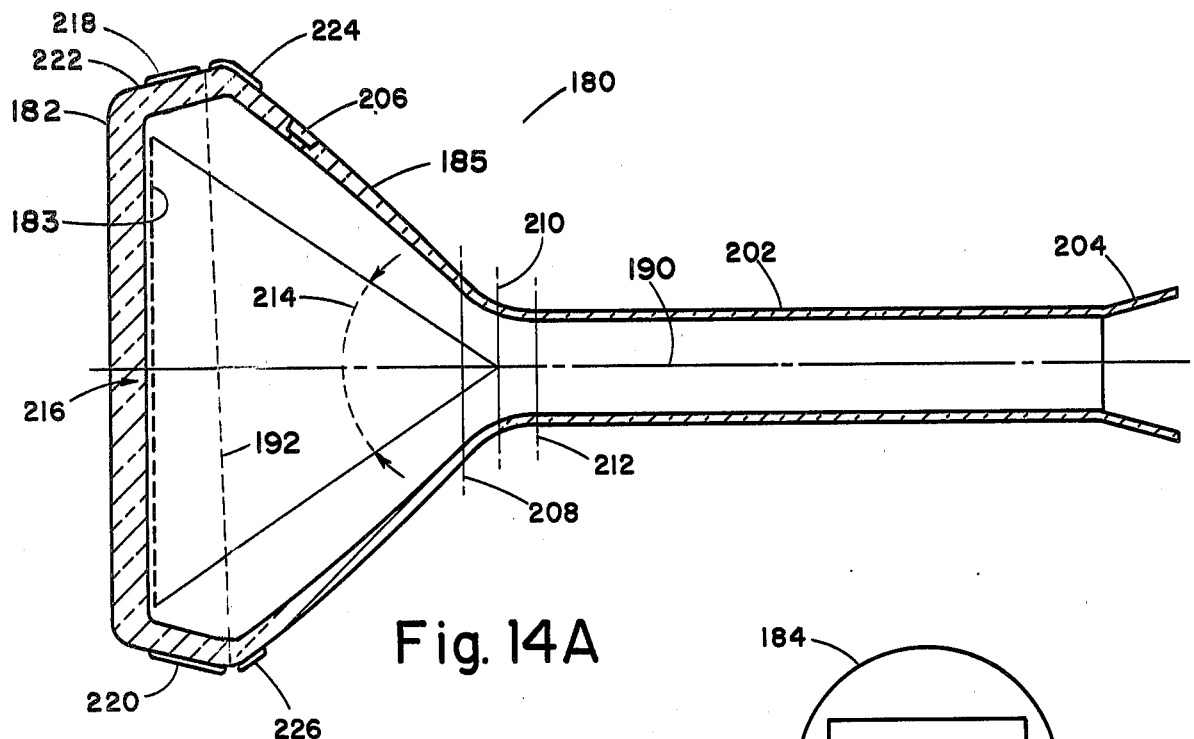
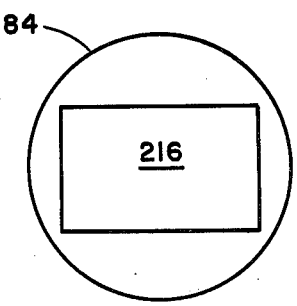
Fig. 14A
Fig. 14C
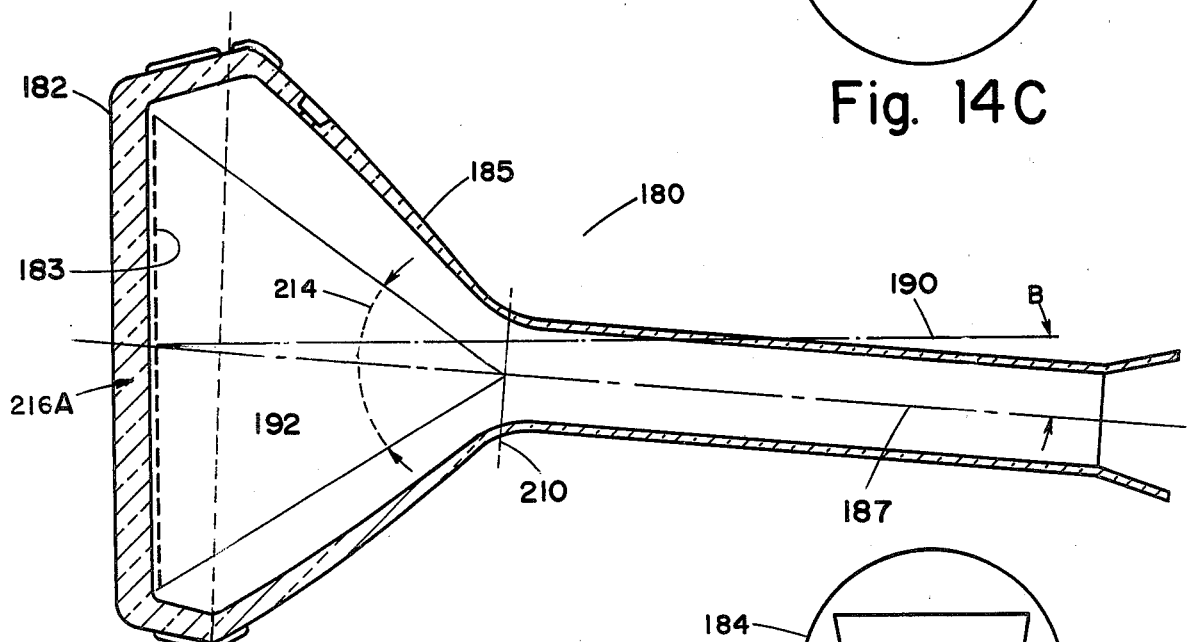
Fig. 14B
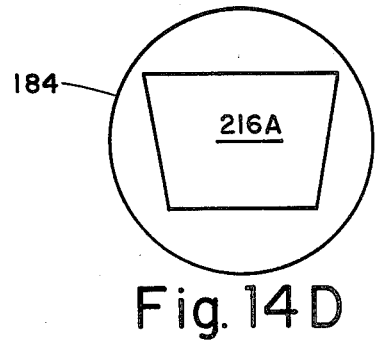
Fig. 14D

ARTICLE OF MANUFACTURE FOR PROJECTION TELEVISION SYSTEM

CROSS-REFERENCE TO RELATED APPLICATIONS

This application is a continuation-in-part of copending application Ser. No. 110,413, filed Jan. 7, 1980 now U.S. Pat. No. 4,274,110 and is related to but in no way dependent upon copending application Ser. No. 127,604, filed Mar. 3, 1980 now abandoned and Ser. No. 197,883 filed Nov. 24, 1980, now U.S. Pat. No. 4,342,942 of common ownership herewith.

BACKGROUND OF THE INVENTION AND PRIOR ART DISCLOSURES

This invention is concerned with television systems, and is particularly directed to projection television systems in which discrete images are projected on a projection screen to provide a composite color picture.

FIG. 1 is a schematic plan view of the essentials of a representative prior art projection television system 6 in which a bank 8 of light projection devices 10, 12 and 14 project through the indicated associated lens means blue, green and red images, respectively, on a remotely located projection screen 16. The projected images are intended to form the composite color image. Projection screen 16, which may be either of the front-projection or rear-projection type, typically has an aspect ratio of 3:4 in consonance with the aspect ratio of the standard television picture.

The centrally located device 12 typically has its projection optical axis 18 in congruence with screen axis 20, and as a result projects an undistorted light image on projection screen 16. The light images projected by devices 10 and 14, however, whose projection optical axis 22 and 24 respectively are located "off-axis" with respect to projection screen axis 20, inherently project light images which are distorted because of their off-axis location.

Two types of optical distortion are inherent in the system which can degrade through misconvergence the composite projected image to the point of unacceptability. The types are trapezoidal distortion and horizontal non-linearity, and they can best be described by the single term "non-linear magnification distortion". As noted, the light image projected by the centrally located device 12 is not subject to non-linear magnification distortion because its projection optical axis 18 is congruent with the projection screen axis 20. As a result, the light image projected on projection screen 16 will by symmetrical and undistorted. The light image projected by device 12 is typically that shown in FIG. 2 by light image 26, indicated as being rectilinear.

This is not so with the light images as projected by devices 10 and 14. The inherent distortion of the light images due to the off-axis location is depicted by FIG. 2, wherein the light image projected by device 10 is indicated by configuration 28 as being trapezoidal. Similarly, the image projected by device 14 is indicated by configuration 30 as being trapezoidal. In a typical prior art projection television system, the non-linear magnification distortion may be of the order of five percent, an amount sufficient to so misregister the images as to render the composite picture unacceptable to the viewer.

It is to be noted that if the projection devices 10, 12 and 14 are vertically stacked, a similar distortion will be realized in the case of devices 10 and 14. The non-linear magnification distortion realized is described in the context of this disclosure, as "keystoning" distortion, rather than "trapezoidal" distortion.

The second form of distortion—horizontal non-linearity—is also in consequence of the location of devices 10 and 14 off the projection screen axis 20. The effect of this type of distortion is depicted in FIG. 3, using as an example the light image 28 projected by light projection device 10, indicated as being trapezoidal due to the aforedescribed non-linear magnification distortion (the trapezoidal shape is exaggerated for the purpose of illustration). The lines 32A–G represent the vertical lines of a television screen cross-hatch generator, as projected. The effect of horizontal non-linearity distortion is apparent in the progressive increase from left to right in the distance between lines 32A–G. The vertical lines of the light image 30 projected by device 14 would be similarly distorted, but in the opposite direction.

One approach to the correction of trapezoidal distortion is by electronic means. For example, the image projected by the off-axis cathode ray tubes of projection means 10 and 14 can be made compensatorily trapezoidal. This can be done by synthesizing a correction wave form for application to a high-speed writing-type yoke which is placed in tandem with the main deflection yoke. The end result is a trapezoidally shaped raster inverse in orientation to the normal distortion of the image projected by the off-axis cathode ray tubes of projection means 10 and 14. Correction by such electronic means is plagued by the complications introduced in the television circuit, with a consequent increase in cost. The complexity and added cost is even greater in consequence of the fact that the correction circuitry for the two off-axis CRT's must be designed to exert an opposite effect on their projected images. The economic burden imposed by the electronic approach is further underscored in view of the fact that while it may be effective against trapezoidal distortion, it is largely ineffective in terms of correction for horizontal non-linearity distortion, wherein additional and very complex electronic correction circuitry must be employed.

Optical systems for reducing or otherwise ameliorating distortion include Oland—U.S. Pat. No. 4,004,093, which discloses a truncated Schmidt optical system wherein a plurality of Schmidt systems are clustered closely together by truncating the mutually adjacent edges of mirrors and correcting lenses which comprise individual Schmidt systems. Such clustering is said to provide a reduction in trapezoidal distortion by virtue of the fact that the cathode ray tubes for each primary color project images which arrive almost orthogonally at the screen.

Hergenrother et al—U.S. Pat. No. 4,024,579—discloses a projection television system in which the composite image is projected onto a curved screen by three discrete cathode ray tubes arranged as a triad, with each projecting a different primary color. The tube optics are folded into a catadioptric configuration and the three images are caused to converge into a composite image by an elaborate optical system that includes a Schmidt correction lens mounted externally to the envelope of each tube. Although the system has achieved a measure of consumer acceptance, the need for an extensive alignment procedure to achieve a satisfactory composite image, and the general lack of brilliance of the projected image, has limited its acceptance.

It is known in the art that if the axis of an electron gun is at an angle with respect to the axis of a cathode ray tube, the visible image on the face panel will exhibit non-linear magnification distortion. This type of distortion was common to certain early image iconoscope tubes of Vladimir Zworykin and was considered a performance liability. An example of a cathode ray tube configuration having an electron gun at an angle with respect to the tube axis is shown in U.S. Pat. No. 2,777,084 to Lafferty.

Pat. No. 28 37 249 (German) discloses a system for optically correcting trapezoidal distortion of the image projected by cathode ray tubes located off a central axis. The projection system includes cathode ray tube color picture sources, each of which projects its image through a projection lens. Trapezoidal distortion is stated as being corrected by tilting the picture sources away from the central axis relative to the light axis of the associated projection lens. As a result, the image on the faceplate of the cathode ray tube is no longer parallel with the screen. When the image on the cathode ray tube faceplate is projected, the image on the screen is reputed to be parallel.

Ohmori, in U.S. Pat. No. 4,194,216, discloses a video projection apparatus having a plurality of cathode ray tubes and associated projection lenses. The apparatus includes a projection lens and a half mirror common to a red and blue cathode ray tube. The projection lenses are arranged so that their optical axes are parallel with each other and perpendicular to the viewing screen. As a result, the projected images are displaced to the right and left of the center of the screen. This displacement is said to be correctable by outwardly and epaxially displacing the cathode ray tubes with respect to the optical axes. However, trapezoidal distortion of the hitherto misaligned, now aligned, images results. This distortion is stated to be corrected by inclining the displaced axis tubes outwardly. This inclination, in conjunction with the refractive index of the glass face plates of the cathode ray tubes, is said to correct the trapezoidal distortion.

Examples of circuit means intended to provide convergence of multiple color image projectors are to be found in the following U.S. Pat. Nos.

Seright—2,654,854
Mengle—2,989,584
Austefjord—3,943,279

OBJECTS OF THE INVENTION

It is a general object of the invention to provide for improved performance in certain projection television systems.

It is another object of the invention to provide for improved performance in projection television systems having off-the-axis image projection devices.

It is yet another object of the invention to provide for a reduction in the cost of projection television systems in terms of enhanced simplicity in design, easier set-up, and minimized need for electronic distortion-correction circuitry.

It is a more specific object of the invention to provide for the elimination of trapezoidal distortion in off-optical axis image projectors in projection television systems.

It is a specific object of the invention to provide for the simultaneous correction of trapezoidal distortion and horizontal non-linearity distortion in projection television systems by purely mechanical means.

It is another specific object of the invention to provide an an article of manufacture providing for self-convergence.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

FIG. 4 is a highly simplified schematic view of a projection television system having off-axis light projection means; FIG. 5 shows diagramatically and in greater detail one such off-axis projection means;

FIG. 6 is a schematic view in perspective showing the beneficial effect of the FIG. 5 embodiment;

FIG. 8 is a view in elevation of an array of nine image-projection devices;

FIGS. 9 and 10 are schematic views of further embodiments of cathode ray tube components;

FIGS. 14A-B are diagrams in section of cathode ray tube components according to the invention; FIGS. 14C-D indicate schematically the effect of the respective components on the electron-formed visible image;

DESCRIPTION OF THE PREFERRED EMBODIMENTS

Figure 1:
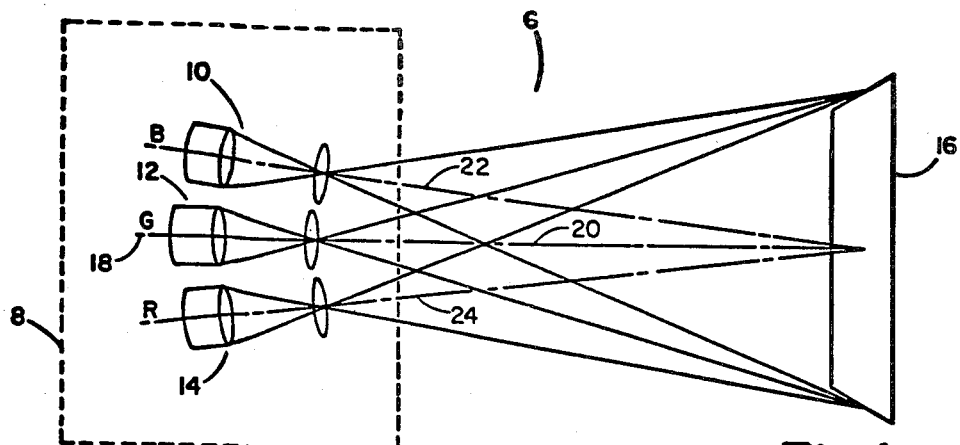
FIGS. 1-3 show diagramatically the cause and effects of two types of non-linear magnification distortion experienced in certain prior art projection television systems; ( The following FIGS. 4-12 are shown in referent U.S. Pat. No. 4,274,110 of which the present application is a continuation-in-part. These drawings and associated descriptions that follow are considered necessary for the understanding of the present invention.)
Figure 2:
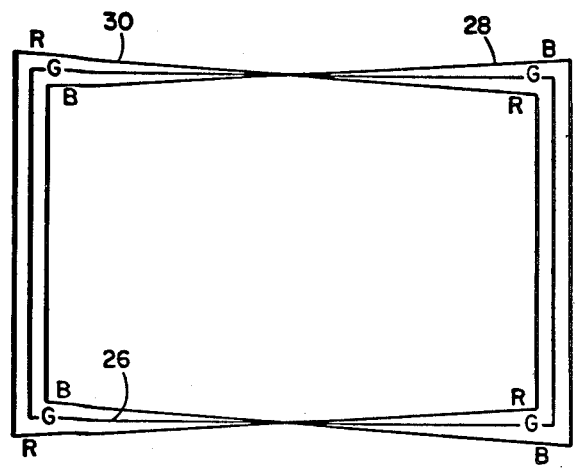
Figure 3:
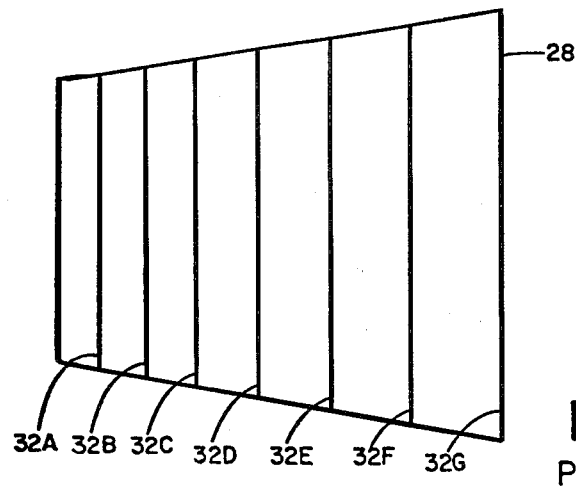

In FIG. 4 there is depicted schematically a projection television system 70. The system 70 has a viewing screen 72 for displaying a light image cast thereon. Screen 72 is remotely located from a plurality of light projection means 74. At least one light projection means, designated as being projection means 76, has a projection optical axis 78 at a non-zero, acute-angle A with respect to the viewing screen axis 80.

With reference also to FIG. 5 wherein projection means 76 is depicted in greater detail, projection means 76 is indicated as including a cathode ray tube means 82 having a cathodoluminescent screen 84 on the inside surface of the face panel 86 whose axis is substantially parallel to the projection optical axis 78. The seal land 85 indicates the junction of the face panel 86 and the funnel 87 of cathode ray tube 82; the significance of the seal and and its orientation will be described infra. The screen is made cathodoluminescent by a deposit of a monochrome phosphor which may comprise, for example, one of a number of phosphors emitting red, green or blue light upon excitation by an electron beam. The electron beam generating means 88, which is typically an electron gun, is disposed on the electron-optical axis 90 of cathode ray tube 82. Electron beam generating means 88 is indicated as emitting a scanning electron beam 92 which forms an electron image on the cathodoluminescent screen 84 in response to television signal information. The electron image is converted to a visible image by cathodoluminescent screen 84 as screen 84 is excited by beam 92.

Lens means 94 on projection optical axis 78 provides for projecting on viewing screen 72 the light image of the electron-formed visible image on cathodoluminescent screen 84. The light image inherently has a non-linear magnification distortion attributable to the location of projection means 76 off the viewing screen axis 80.

The non-linear magnification distortion of the light image as projected on viewing screen 72 is shown in FIG. 4 as being trapezoidal, as indicated by the dash-line image 98. Horizontal non-linearity distortion is also present as described heretofore.

The projection television system according to the invention described and fully claimed in the referent 110 patent copending application application Ser. No. 110,413 is characterized by the electron-optical axis 90 of cathode ray tube means 82 defining a non-zero, acute-angle B with respect to the axis of cathodoluminescent screen 84. The value of angle B and the orientation of the electron-optical axis is selected to cause the electron-formed visible image to have an orientation and non-linear magnification distortion effective to substantially compensate for the off-axis-induced non-linear distortion of the projected light image.

The remedial effect is depicted in FIG. 6, which is view looking over the screen 72 and toward the face panel 86 of light projection means 76. An electron-formed visible image 104A, depicted as being trapezoidal has an orientation and non-linear magnification distortion effective to substantially compensate for the off-axis-induced non-linear magnification distortion of the projected light image. Image 104A is shown as being reversed in orientation by transmission through lens means 94; the shape of the image in space as projected on viewing screen 72 is indicated by light image 104B. It will be seen that image 104A substantially compensates for the off-axis-induced non-linear magnification distortion, as indicated by image 104C cast on viewing screen 72, depicted as being substantially free of non-linear magnification distortion.

Figure 7:
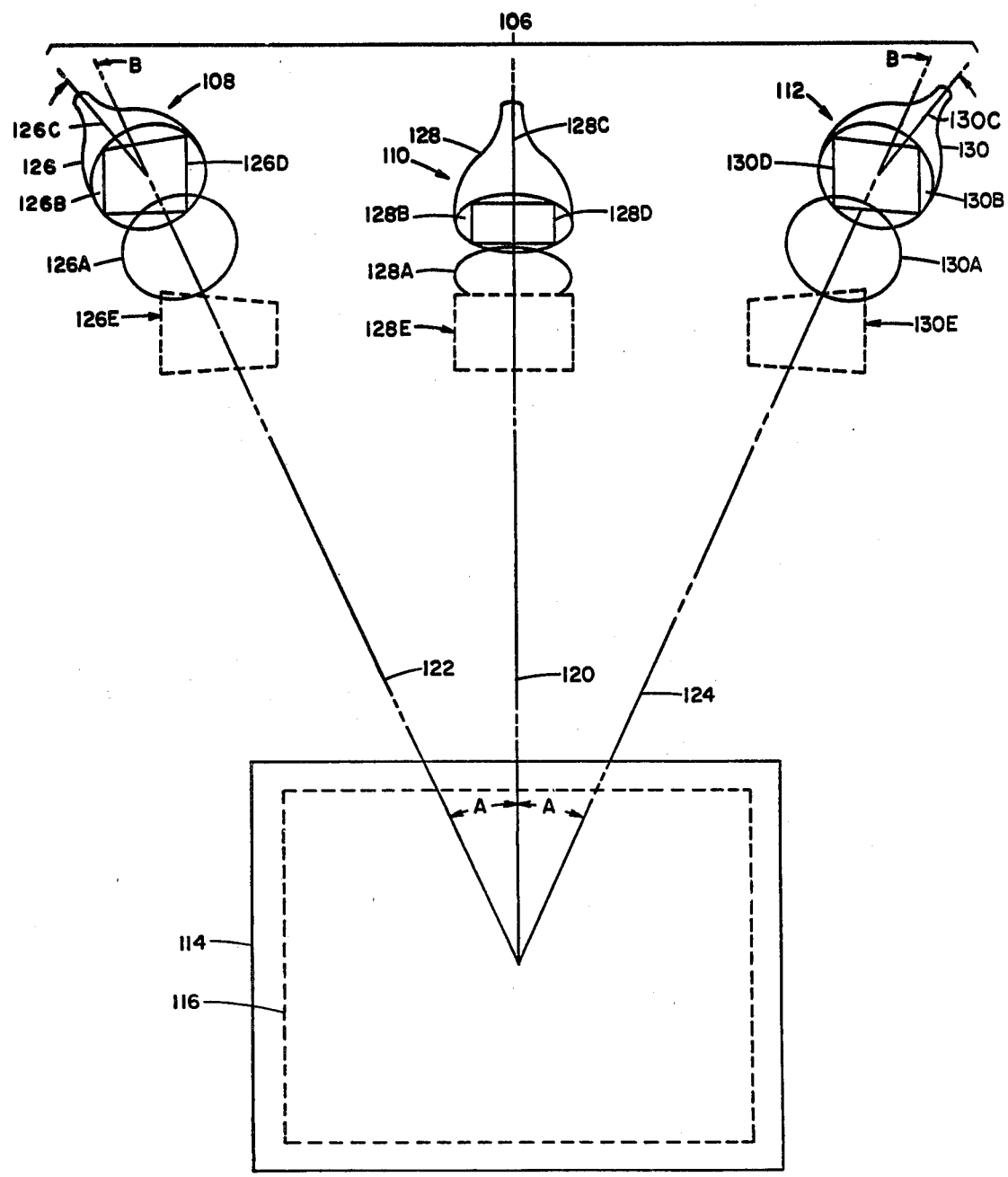
FIG. 7 is a simplified view in perspective of a projection television system having three light projection means.

A bank of three light projection means for use in a projection television system is shown by FIG. 7 (and by FIG. 8, as will be noted). Bank 106 comprises light projection means 108, 110 and 112 for projecting, by way of example, red, green and blue images, respectively, to form a composite color image in space. A viewing screen 114 provides for receiving the composite color image 116, the perimeter of which is indicated by the dash lines.

Light projection means 108, 110 and 112 comprise, respectively, cathode ray tube means 126, 128 and 130, and associated lens means 126A, 128A and 130A. Each tube has a cathodoluminsecent screen indicated, again respectively, by 126B, 128B and 130B disposed on the inside surface of the face panel thereof. Each light projection means has electron-beam generating means disposed on an associated electron-optical axis 126C, 128C and 130C for forming an electron image on the associated cathodoluminescent screen; the electron images are converted to visible images by the respective cathodoluminescent screens. Lens means 126A, 128A and 130A provide for projecting on viewing screen 114 the light images of respective electron-formed visible images to form composite color image 116.

Light projection means 110 is shown as being "on-axis"; that is, its electron optical axis 128C is congruent with its projection optical axis 120. As a result, the electron-formed visible image 128D formed on its screen 128B is rectilinear. Also as a result, the light image 128E that it projects is rectilinear and the light image cast on the screen is rectilinear and in coincidence with the composite color image 116, of which it forms a part.

Light-projection means 108 and 112, however, project a light image inherently having non-linear magnification distortion attributable to their location off the projection screen axis 120. These may be termed "displaced-axis" tubes. This inherent distortion is compensated for by the electron-optical axes 126C and 130C of the respective cathode ray tube means 126 and 130 each defining a non-zero, acute-angle B with respect to the axes of the associated cathodoluminescent screens 126B and 130B. The value of angles B and the orientation of the electron-optical axes is selected to cause the electron-formed visible images 126D and 130D to have an orientation and non-linear magnification distortion effective to substantially compensate for the off-axis-induced non-linear magnification distortion of the projected light images. The projected light images are indicated as being trapezoidal images 126E and 130E, respectively, as projected by light-projection means 108 and 112. The projected light images 126E and 130E, when cast on viewing screen 114 are substantially free of non-linear magnification distortion, and are indicated as being mutually coincident with the rectilinear composite color image 116.

The projection system described can comprise a bank of three light-projection means oriented side-by-side in a horizontal plane. This embodiment is indicated by the three light-projection means comprising bank 144 of FIG. 8. Alternately, the light projection means could as well comprise a vertical stack, as indicated by the light-projection means of column 150.

FIG. 8 shows an array 140 of three banks 142, 144 and 146 of light projection means for projecting a very bright composite image. (Associated lens means are not shown). Each bank consists of three light projection means for projecting into coincidence with adjacent light projection means red, green and blue images, respectively. The order of the color images is exemplary only, and not limiting. The column 148 of light projection means may, for example, project red images; center column 150 may project green images, and column 152, blue images, to form the composite color image in space. A remotely located viewing screen (not shown) receives and displays the composite color image.

Each light projection means in array 140 comprises a cathode ray tube means having a cathodoluminescent screen on the inside surface of the face panel thereof whose axis is substantially parallel with its projection optical axis. Electron-beam generating means are disposed on the cathode ray tube electron-optical axis for forming an electron image on the cathodoluminescent screen which is thereby converted to a visible image. The lens means (not shown) provide for projecting on the viewing screen a light image of the electron-formed visible image that is on the cathodoluminescent screen. As described heretofore with regard to other configurations of projection television system, the light images of off-axis-located cathode ray tubes inherently have non-linear magnification distortion attributable to the location of the projection means off the projection screen axis. The array projection system is characterized by the cathode ray tube electron optical axis of each of the off-axis projection means defining a non-zero, acute angle with respect to the axis of the cathodoluminescent screen. The value of the angle and the orientation of the electron-optical axis is selected to cause the electron-formed visible image to have an orientation and non-linear magnification distortion effective to compensate for the off-axis-induced non-linear magnification distortion of the projected light image.

The electron-formed visible images of the off-axis cathode ray tubes of the nine-tube array shown by FIG. 8 are effective to substantially compensate for the off-axis location of the respective cathode ray tubes. Image A, projected by a center tube, whose projection optical axis is congruent with the screen axis, is shown as being non-distorted, and when projected, will form a rectilinear image on the projection screen. The images B and C of the adjacent off-axis cathode ray tubes are shown as being trapezoidal and keystone-shaped, respectively, but when projected will substantially compensate for the off-axis-induced non-linear magnification distortion of the projected images. Images D of the corner cathode ray tubes, which may be termed "scalene quadrilaterals," similarly compensate for the off-axis location of the associated cathode ray tubes. The result is that the red, green and blue images when projected form a composite color image in space wherein any non-linear magnification distortion due to off-axis location is substantially compensated for. (It must be remembered that the associated lens means reverse the images.)

An array of light-projection means, shown as numbering nine in FIG. 8, may comprise a lesser number. For example, the array may comprise two banks, such as banks 142 and 144, or, banks 144 and 146.

FIG. 9 depicts another embodiment wherein a cathode ray tube 154 comprising a component of a light-projection means for a projection television system has a face panel 156 and associated cathodoluminescent screen disposed on the projection optical axis 160. The projection system is characterized by the electron-beam axis 162 defining a non-zero, acute-angle B with respect to the projection optical axis 160. The value of angle B and the orientation of the electron-beam axis 162 is selected to cause the electron-formed visible image on cathodoluminescent screen 158 to have an orientation and a non-linear magnification distortion effective to substantially compensate for the off-axis-induced non-linear magnification distortion of the projected light image.

Another configuration of a projection system cathode ray tube is shown by FIG. 10, wherein the axis 157 of the electron-beam generating means 159 defines a non-zero, acute-angle B with respect to the projection optical axis 161. The neck 163, which encloses electron-beam generating means 159, is shown as extending at a non-zero, acute-angle B from a hemispherical funnel section 165. It should be noted that the angle B depicted is exaggerated for illustrative purposes; the non-zero, acute-angle B in this and all figures is, as a general rule in the range of a nominal 3 to 9 degrees. This range is provided for example only, and is not a limitation.

A method for compensating for the non-linear magnification distortion of the image projected by a light projection means whose projection optical axis is oriented off the projection screen axis comprises the following. A cathode ray tube is provided which includes associated projection lens means; these components comprise the light projection means. The cathode ray tube means has a cathodoluminescent screen on the inside surface of the face panel thereof whose axis is substantially parallel to the projection optical axis. An electron-beam generating means is disposed on an electron-optical axis of the cathode ray tube for forming an electron image on the cathodoluminescent screen which is converted to a visible image by the cathodoluminescent screen. The cathode ray tube electron-optical axis is positioned so as to define a non-zero, acute angle with respect to the axis of the cathodoluminescent screen. A value of the angle and an orientation of the electron-optical axis is selected to cause the electron-formed visible image to have an orientation and non-linear magnification distortion effective to substantially compensate for the off-axis-induced non-linear magnification distortion of the projected light image. Alternatively, the method may comprise the positioning of the cathode ray tube electron-optical axis so as to define a non-zero, acute angle with respect to the projection optical axis.

Here follows a description for utilizing the means in a projection television system. It is to be recognized that the means described are by way of example only, and that other arrangements and configurations will readily occur to those skilled in the art.

The cathode ray tube means preferably comprise round face panel tubes having a face panel diameter of about 5 inches. The face panels of one or more of the tubes used in a multiple-tube system could as well be rectangular or square, if desired. The monochrome phosphor, whether red, green or blue, deposited on the cathodoluminescent screen that converts the electron image to a visible image, is preferably a high-emission type for optimum image brightness; such phosphors are well known in the present art. The cathode ray tube deflection angle is preferably about 70 degrees, an angle which provides a short-necked tube which permits display cabinet depth reduction in tight packaging concepts.

The electron gun is preferably of the high-performance type, one that will produce a small beam spot with minimum spot blooming at high beam currents to provide good resolution. For maximum brightness, the ultor anode voltage is preferably in the range of 28–30 kilovolts. The standard CRT electron gun configurations—the bipotential, the unipotential, or the extended field lens—all lend themselves readily to application in projection television systems.

A salient benefit of the system is that a relatively simple, uniform-field deflection yoke can be used; the yokes can be identical for all cathode ray tubes in the projection system. Because there is no need for elaborate electronic circuits to correct for trapezoidal distortion, the secondary high-speed writing yoke normally mounted behind the deflection yoke in certain prior art projection systems is not required.

The lens means, one of which is associated with each cathode ray tube, may comprise for example, an aspheric, three-element lens having coated surfaces, and preferably a five-inch focal length. For maximum brightness of the projected image, the lens should be of the high-speed type of F1.0 or less. The lens is preferably permanently mounted in conjunction with its associated cathode ray tube, so no adjustments will be necessary either in factory or field.

A bank of light-projection systems arranged for side-by-side mounting in a horizontal plane, as depicted by FIG. 7, can be mounted permanently on a rigid metal bed.

It has been observed in connection with FIG. 7 that the electron-optical axis 128C of light projection means 110 is congruent with its projection optical axis 120. The light projection means 108 and 112 adjacent to light projection means 110, however, lie off-axis; that is, their projection optical axes 122 and 124 lie at non-zero acute-angles A with respect to the projection screen axis 120, as indicated. The electron-optical axes of each off-axes projection means 108 and 112 define a non-zero, acute-angle B with respect to the screen axes 120. The non-zero, acute-angle A may be, for example, about seven degrees. The non-zero, acute angle B may also be about seven degrees, and as a general rule, angle A and B may be considered to be equal. The value of angle B and the orientation of the electron-optical axes is selected and is effective to provide an electron-formed visible image configured and oriented to substantially compensate for the aforedescribed off-axis induced trapezoidal distortion. The angle values cited are in no way limiting. Angles in the range of three to nine degrees, or greater or lesser, could as well be utilized, with the selection of the particular angle made on the basis of the requirements of a particular projection system. (Other angle values will be cited infra.) Factors in the determination of the proper angles include the location of the off-axis tube, focal length of the lens, the magnification of the lens, the size of the projection screen, and the distance between the light projection means and the projection screen, and the distance the off-axis tubes are from the screen axis.

The viewing screen of the preferred embodiment is 50 inches in diagonal measure, and the aspect ratio is 3:4, in consonance with the standard television picture format. The distance from the electron image on the cathodoluminescent screen of the cathode ray tube is typically 58.3 inches. The screen may be either a rear projection type or a front projection type. Gain is normally built into the screen to provide added brightness; the gain factor may be as great as 10.

The optical path of the projection system may be "folded"; that is, mirrors may be used between the light projection means and the projection screen so that the projection system can be embodied in a relatively small cabinet. Adjustments in the location of the image on the projection screen can be accomplished by tilting of one or more of the mirrors by simple mechanical means known in the art.

Adjustments for static convergence of the discrete monochrome images that make up a composite color image, as well as other adjustments such as horizontal sweep, can be accomplished with standard television receiver circuits in present use.

The high-brightness projection television system described is essentially a self-converged system and therefore requires only static convergence; that is, horizontal and vertical centering. There is no requirement for purity set-up since the shadow mask is not used in the projection tubes. Horizontal and vertical centering is required to obtain coincidence of the three image centers. The position on the viewing screen and the size of the green picture image is first established. Then the height and width of scan of the red and blue image projection devices is established to provide registration of the three images.

Figure 11:
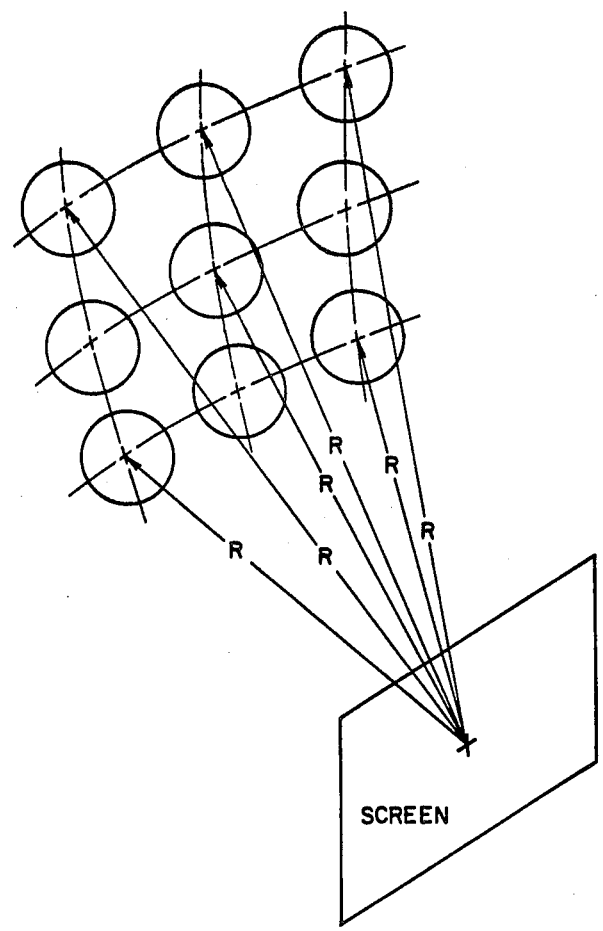
FIGS. 11 and 12 indicate diagramatically the relative positions and orientations of an array of light-projection components.
Figure 12:
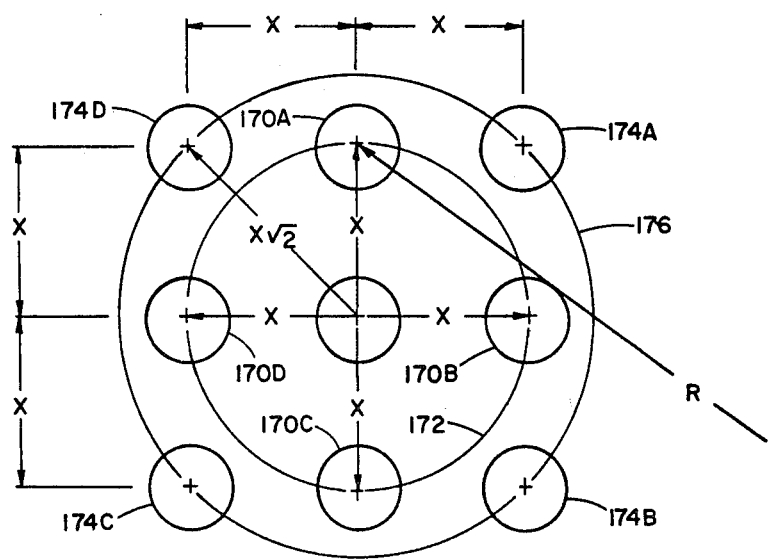

As indicated by FIG. 11, the face panels of all cathode ray tubes of an array (whatever the number in the array, whether three, four, six or nine, e.g.) are positioned with respect to the screen on a spherical surface with a radius R; that is, the center of each face panel is perpendicular to a sphere radius R extended from the center of the projection screen. The spatial relationship of the face panels of an array of nine cathode ray tubes is shown by FIG. 12. If a sphere radius R is drawn through the centers of the face panels 170A, 170B, 170C and 170D on a radius x from the center point of the array, a right circular cone is generated whose base is indicated by 172, and whose apex is the center of the projection screen. Face panels 170A-D are off the projection optical axis by the same angular magnitude. This is the aforedescribed non-zero, acute-angle A. The face panels 174A, 174B, 174C and 174D, however, are on a radius $(R = x\sqrt{2})$ with respect to the center of the array, and the non-zero, acute-angle formed with respect to these near or on-diagonal tubes is a complex angle having both horizontal and vertical components relative to the axis of the cathodoluminescent screen. The base of the right circular cone on which face panels 174A-D depend is indicated by reference numeral 176.

It may be assumed that a plurality of different face panel-funnel configurations may be required, especially in multiple-cathode ray tube arrays such as depicted in FIG. 8.

Figure 13A:
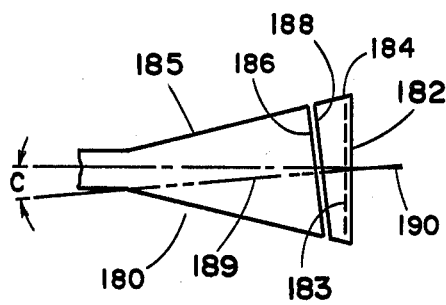
FIG. 13A-C are schematic views illustrating the method of forming cathode ray tube components.
Figure 13B:
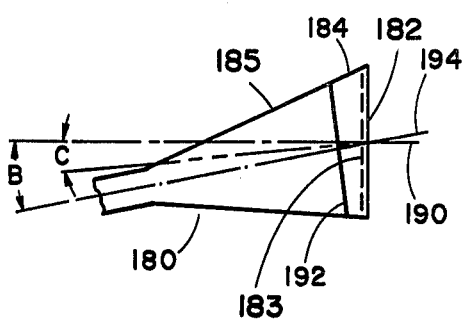
Figure 13C:
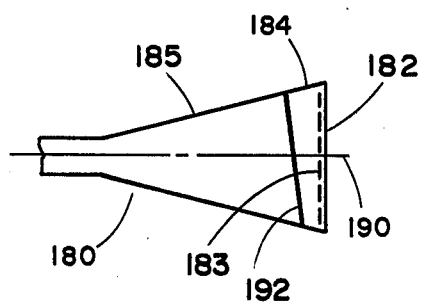

A cathode ray picture tube 180 for use in a projection television system is depicted schematically in FIGS. 13A-C. The projection optical axis 190 of tube 180 is displaced from the axis of a remotely located viewing screen (not shown) by a non-zero acute angle A. 1 (Please refer to FIG. 4 for an example of a cathode ray tube 76 whose projection optical axis 78 is displaced from the viewing screen axis 80 by said angle A.) Picture tube 180 is shown as having a conjoinable face panel 182 with a rearwardly extending skirt 184 and a funnel 185. The skirt 184 of panel 182 mates along interfacing funnel seal edge 186 and face panel seal edge 188.

Tube 180 has a cathodoluminescence imaging screen 183 deposited on the inner surface or "window" of face panel 182; the axis of the window (and cathodoluminescent screen) is substantially coincident with the electron-optical axis 187, and normally coincident with projection optical axis 190. Imaging screen 183 provides an electron-formed visible image for projection on the viewing screen.

Funnel seal edge 186 is formed as depicted to define a plane whose normal makes an angle (designated at being angle C) with respect to the funnel axis 189 substantially equal to one-half the aforedescribed angle A. Seal edge 188 of face panel 182 is formed to define a plane whose normal makes an angle (also indicated as being an angle C) with respect to the axis of the imaging screen 183, or window, substantially equal to one-half said angle A.

Funnel 185 is aligned according to the invention with respect to face panel 182 to tilt the electron-optical axis 187 with respect to the projection optical axis 190 by an angle B substantially equal to said angle A; this configuration is shown by FIG. 13B. When seal edges 186 and 188 are conjoined, forming seal land 192, the value of angle B and the orientation of the electron-optical axis 187 causes the electron-formed visible image on cathodoluminescence screen 183 to have an orientation and non-linear magnification distortion effective to substantially compensate for the off-axis-induced, non-linear magnification distortion of the light image projected thereby on the viewing screen.

An article of manufacture according to the invention for use in a projection television system comprises a cathode ray picture tube 180 having a face panel 182 with a rearwardly extending skirt 184 and a window for receiving a cathodoluminescence imaging screen 183. The panel skirt 184 is conjoinable with funnel 185 by mating along interfacing edges. The edge of the skirt 184 defines a plane whose normal makes a non-zero acute cant angle with respect to the axis of the window. The funnel edge defines a plane whose normal makes a non-zero acute cant angle with respect to the funnel axis 189. Thus the funnel can be aligned and conjoined with the face panel to define a selected tilt angle with respect to the axis of the window. When the interfacing edges are conjoined as by frit sealing, the tube has a seal land which defines a plane whose normal makes a non-zero acute angle with respect to the axis of the window. As depicted by FIG. 13B, funnel 185 is, in effect, aligned by its "rotation" with respect to face panel 182 a distance effective to provide the non-zero acute angle B having a desired value. The non-zero, acute angle B is that angle which is substantially equal to the aforedescribed angle A. The "rotation" of funnel 185 with respect to face panel 182 is typically about 180 degrees.

Figure 13D:
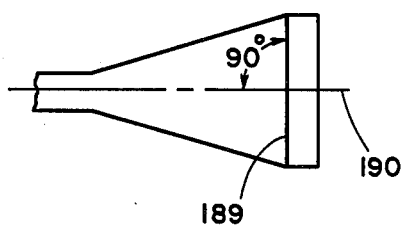
FIG. 13D depicts schematically a standard cathode ray tube for comparison purposes.

FIG. 13D depicts for comparison purposes a standard cathode ray tube wherein the interfacing edges (the conjoining of which is indicated by seal land 189) define a plane whose normal is coincident with the projection optical axis 190.

With reference again to FIG. 8, a cathode ray tube having the aforedescribed characteristics; that is, wherein the value of angle B is 4.74 degrees, by way of example, could be used in the off-axis image display means locations of both bank 144 and row 150 which project electron-formed visible images B and C, respectively. However, the cathode ray tubes used in the off-axis image display means which project electron-formed visible images D, would necessarily have a different value of angle B. As described in connection with FIG. 12, the face panels 174A–D are on a different radius ($R = x\sqrt{2}$) than the face panels 170A–D (radius x). For example, if angle B is 4.74 degrees for image display means having face panels located on a radius x (face panels 170A–D), the value of the angle B of the display means whose face panels are located on a radius $R = x\sqrt{2}$ (face panels 174A–D) would be 6.67 degrees.

One pair of glass molds can be utilized for the manufacture of both an on-axis tube and a displaced-axis tube, while providing for the compensating for the non-linear magnification distortion of the projected image of the displaced-axis tube. A projection television system of this type is depicted in FIG. 7, wherein an on-axis tube 110 is shown in conjunction with two such displaced-axis tubes 108 and 112. The method comprises the following, with reference again to FIGS. 13A–C. (Both of the displaced axis tubes 108 and 112 are considered as being of like construction.)

The funnel seal edges 186 of both the on-axis tube (of which there can be only one) and a displaced-axis tube are formed by a funnel mold to define planes whose normal makes an angle substantially equal to one-half the angle A with respect to the funnel axis. Similarly, the face panel seal edges 188 of the on-axis tube and a displaced-axis tube are formed by a face panel mold to define planes whose normal makes an angle substantially equal to one-half the angle A with respect to the face panel axis. The funnel of the displaced-axis tube is aligned with respect to its face panel to tilt the electron-optical axis 187 with respect to the projection optical axis 190 by an angle B substantially equal to angle A. This configuration is depicted by FIG. 13B. The funnel of the on-axis tube is aligned and conjoined with respect to its face panel so that the electron-optical axis 194 is coincident to the projection optical axis 190. This configuration is depicted by FIG. 13C. The seal edges 186 and 188 of the respective tubes are then conjoined forming seal land 192. The face panels and funnels of both the on-axis tube and the displaced axis tube can be formed by one pair of glass molds. Thus one pair of the aforedescribed glass molds can be used to form the face panels and funnels of the cathode ray tubes in bank 144 and row 150 depicted by FIG. 8.

It will be observed that the face panel itself of a displaced-axis tube is not tilted per se, but that the remainder of the tube; that is, the funnel and neck which are aligned on the electron-optical axis, are more properly termed as being tilted with respect to the face panel. This characteristic will be noted with regard to FIG. 8 wherein the respective necks n of the cathode ray tubes other than the center, on-axis cathode ray tube 168; that is, those providing electron-formed visible images B, C and D, will be observed to be directed at angles outwardly from the center, with the electron-optical axes of the cathode ray tubes providing images B lying in the horizontal plane and with the axes of those providing images C lying in the vertical plane. In addition to the tilt implicit in a displaced-axis tube provided by the tilt of the electron-optical axis, the entire tube and its associated lens may be further tilted outwardly from the center so that the necks of tubes of an array viewed from the rear appear to "fan out." The determination of the amount of such physical tilting is an empirical matter determined largely by visual observation of the projected image.

A second pair of molds is required for the cathode ray tubes shown in FIG. 8 which are on diagonals with respect to the center cathode ray tube 168; these are the cathode ray tubes providing electron-formed visible images D. The requirement for a second pair of molds is based on the fact that the respective angles B are different as described heretofore; i.e., angle B for the tubes in bank 144 and column 150 (radius=x) is described as being 4.74 degrees, while the angle B for the tubes located on the diagonal (radius=$x\sqrt{2}$) is described as being 6.67 degrees.

The respective necks n of the CRT's providing images D lie at an angle of essentially two times angle B with respect to the horizontal axis. After providing the proper angle B, noted for example as being 6.67 degrees for the diagonally located CRT's exhibiting images D, the CRT's are rotated from the horizontal plane to provide an angle essentially two times angle B to provide images D of the scalene quadrilateral shape indicated which, when projected, compensate for the off-axis, diagonal location of the cathode ray tubes providing images D.

The preferred embodiments of the invention shown schematically by FIGS. 13A–C are depicted in more realistic detail in FIGS. 14A–B. With specific reference to FIG. 14A, in which an on-axis tube is depicted, face panel 182 cathodoluminescent screen 183, and funnel 185 of cathode ray tube 180 are shown. Splice line 192 represents the conjoining of the interfacing edges of funnel 185 and face panel 182. The funnel 185 is aligned with respect to its face panel 182 such that the electron-optical axis is coincident with the projection optical axis 190. There is indicated additionally a neck 202, a flare 204 and an anode button 206. The yoke reference line 208, deflection center 210, and a neck splice line 212 are also indicated. The angle of deflection 214 of the electron beam (not indicated) from deflection center 210 is preferably 70 degrees. The electron-formed visible image 216 is indicated in FIG. 14C as being rectilinear in shape and essentially occupies an area on face panel 184 as depicted. The minimum useful screen area for the visible image 216 comprises an area of circular face panel 182 of three inches by four inches, with a five-inch diagonal.

Alignment ribs 218 and 220 are embossed 180 degrees apart on the flange 222 of face panel 182. Alignment ribs 224 and 226 are located adjacently to ribs 218 and 220, respectively. The alignment ribs provide for accuracy in the aforedescribed aligning of the funnel 185 with respect to its face panel 182. These alignment means are described and claimed in the referent copending application Ser. No. 197,883 now U.S. Pat. No. 4,342,942.

The dimensions in inches of the cathode ray tube 180 depicted by way of example in FIG. 14A may be as follows. All dimensions and values cited in the following, as well as those in other parts of the specification, are provided by way of example only, and are intended to be in no way limiting. Changes in dimensions and configurations will no doubt occur to those skilled in the art—changes which are yet within the scope and compass of the invention.
diameter of face panel 182: 6.25
overall length of CRT 180: 11.25
O.D. of neck 202: 1.125
I.D. of neck 202: 0.955
distance between face panel and
 yoke reference line 208: 3.65
 deflection center 210: 3.97
thickness of face panel 182: 0.400

The valve of the respective angles B and C in degrees may be, for example (please refer to FIG. 13B):
Angle B: 4.74
Angle C: 2.37

FIG. 14B depicts a displaced-axis tube of like construction and having the same basic dimensions as the aforedescribed on-axis tube. The funnel 185 is aligned with respect to its face panel such as to tilt the electron-optical axis 187 with respect to the projection optical axis 190 by an angle B. The electron-formed visible image 216A is displaced in a measure; however, it remains within the field of the cathodoluminescent screen 183. The beneficial non-linear magnification distortion of the image 216A resulting from application of the invention is shown by FIG. 14D.

Figure 15A:
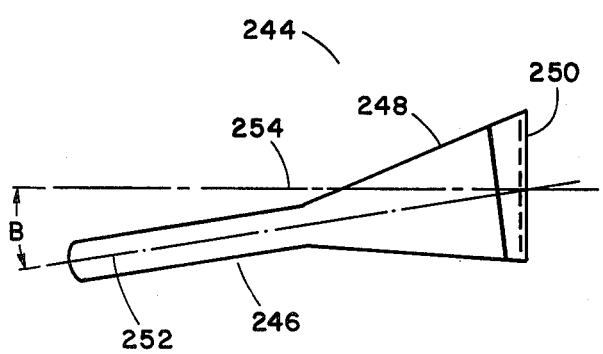
FIGS. 15A-B are schematic views of a cathode ray tube component according to the invention having a rectangular face panel.
Figure 15B:
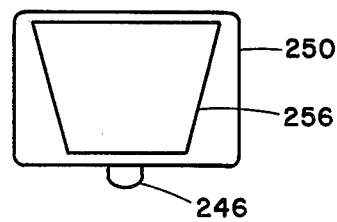

An example of a displaced-axis cathode ray tube 244 having a neck 246, a funnel 248 and a substantially rectangular face panel 250 in lieu of the round face panel hitherto depicted and described is shown schematically by FIGS. 15A–B. The electron-optical axis 252 of cathode ray tube 244 is caused to define a non-zero, acute angle B (shown greatly exaggerated) with respect to the cathodoluminescent screen axis 254. The resulting electron-formed visible image 256 (see FIG. 15B) has an orientation and a non-linear magnification distortion effective to substantially compensate for the off-axis-induced non-linear magnification distortion of the projected light image. The configuration of cathode ray tube 244 could be used in the location occupied by cathode ray tube 170, shown by FIG. 8; and if cathode ray tube 244 is inverted, in place of cathode ray tube 166.

Figure 16:
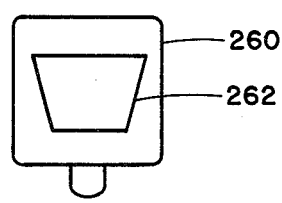
FIG. 16 shows schematically a cathode ray tube component according to the invention having a square (equilateral rectangular) face panel.

The face panel could as well be of "square" configuration (an equilateral rectangle), as shown by FIG. 16, in which face panel 260 is shown as displaying an electron-formed visible image 262 similar to image 256 displayed by face panel 250 depicted by FIG. 15B. Also similarly, a cathode ray tube having a square face panel 216 could be used when properly oriented as noted in the location occupied by either cathode ray tube 116 or 177 shown by FIG. 8. Both the rectangular and the square cathode ray tube panel configurations can, when properly oriented, as well be used in place of the cathode ray tubes displaying images B in bank 144 of FIG. 8.

While particular aspects of the invention thereof have been shown and described, it will be obvious to those skilled in the art that changes and modifications may be made without departing from the invention in its broader aspects, and therefore, the aim of the appended claims to cover all such changes and modifications as fall within the true spirit and scope of the invention.

I claim:

1. For use in a projection television system, an article of manufacture comprising a cathode ray picture tube having a face panel with a rearwardly extending skirt and a window for receiving a cathodoluminescent imaging screen, said tube having a seal land which defines a plane whose normal makes a non-zero acute angle with respect to the axis of said window.

2. The cathode ray tube defined by claim 1 wherein said face panel is circular.

3. The cathode ray tube defined by claim 1 wherein said face panel is a rectangle.

4. For use in a projection television system, an article of manufacture comprising a glass cathode ray picture tube having a face panel with a rearwardly extending skirt and a window for receiving a cathodoluminescent imaging screen, the edge of said skirt defining a plane whose normal makes a non-zero, acute angle with respect to the axis of said screen.

5. For use in a projection television system, an article of manufacture comprising a cathode ray picture tube having a face panel with a rearwardly extending skirt and a window for receiving a cathodoluminescent imaging screen, said panel skirt being conjoinable with a funnel by mating along interfacing edges, with the edge of said skirt defining a plane whose normal makes a non-zero acute cant angle with respect to the axis of said window said funnel edge defining a plane whose normal makes a non-zero acute cant angle with respect to the funnel axis, whereby said funnel can be aligned and conjoined with said face panel to define a selected tilt angle with respect to the axis of said window.

6. The article of manufacture defined by claim 5 wherein the angle defined by said skirt edge is substantially equal to the angle defined by said funnel edge.

7. The article of manufacture defined by claim 5 wherein each cant angle is approximately equal to one-half of said tilt angle.

8. For use in a projection television system, a cathode ray picture tube whose projection optical axis is displaced from the axis of a remotely located viewing screen by a non-zero acute angle A, and with a cathodoluminescent imaging screen whose axis is substantially coincident with said projection optical axis and normally coincident with the electron-optical axis of said tube, said imaging screen providing an electron-formed visible image for projection on said viewing screen, said cathode ray picture tube having a conjoinable face panel with a rearwardly extending skirt and a funnel which mate along interfacing seal edges, said funnel seal edge being formed to define a plane whose normal makes an angle with respect to the funnel axis substantially equal to one-half said angle A, and with said face panel seal edge formed to define a plane whose normal makes an angle with respect to the imaging screen axis substantially equal to one-half said angle A, said funnel being aligned with respect to said face panel to tilt said electron-optical axis with respect to said projection optical axis by an angle B substantially equal to said angle A, such that when said seal edges are conjoined, the value of said angle B and the orientation of said electron-optical axis causes said electron-formed visible image to have an orientation oand non-linear magnification distortion effective to substantially compensate for the off-axis-induced, non-linear magnification distortion of the light image projected thereby on said viewing screen.

9. The cathode ray tube defined by claim 8 wherein said face panel is circular.

10. The cathode ray tube defined by claim 8 wherein said face panel is rectangular.

* * * * *